(12) United States Patent
Lingren et al.

(10) Patent No.: US 6,516,558 B1
(45) Date of Patent: Feb. 11, 2003

(54) INSECT TRAP AND ASSEMBLY FOR CAPTURING AND MONITORING INSECTS

(75) Inventors: Bill W. Lingren, Carmel Valley, CA (US); Don H. Lenker, Salinas, CA (US)

(73) Assignee: Trece, Inc., Salinas, CA (US)

( * ) Notice: Subject to any disclaimer, the term of this patent is extended or adjusted under 35 U.S.C. 154(b) by 0 days.

(21) Appl. No.: 09/574,562

(22) Filed: May 17, 2000

Related U.S. Application Data (63) Continuation-in-part of application No. 09/044,586, filed on Mar. 19, 1998.
(60) Provisional application No. 60/040,839, filed on Mar. 19, 1997.

(51) Int. Cl.[7] ................................................. A01M 1/14
(52) U.S. Cl. ................................................ 43/107; 43/114
(58) Field of Search ....................... 43/107, 114, 122, 43/132.1; 24/27, 30.5 T (56) References Cited

U.S. PATENT DOCUMENTS

| | | | | |
|---|---|---|---|---|
| 862,467 A | * | 8/1907 | Gardiner | 43/114 |
| 1,071,578 A | * | 8/1913 | Rese | 43/114 |
| 1,112,064 A | * | 9/1914 | Gordon | 43/114 |
| 1,118,845 A | * | 11/1914 | Day | 43/114 |
| 2,224,050 A | * | 12/1940 | Hermann et al. | 24/27 |
| 2,973,597 A | * | 3/1961 | Powell | 24/30.5 T |
| 3,409,948 A | * | 11/1968 | Goodwin | 24/30.5 T |
| 3,506,116 A | * | 4/1970 | Winters | 24/27 |
| 3,685,199 A | * | 8/1972 | Bradshaw | 43/114 |
| 3,729,858 A | * | 5/1973 | Bradshaw | 43/114 |
| 3,755,958 A | * | 9/1973 | Bradshaw | 43/114 |
| 3,863,384 A | * | 2/1975 | Weatherston et al. | 43/114 |
| 4,133,137 A | * | 1/1979 | Van Adelsburg | 43/114 |
| 4,156,321 A | * | 5/1979 | Capizzi | 43/114 |
| 4,407,082 A | * | 10/1983 | Stehouwer | 24/30.5 T |
| 4,442,624 A | * | 4/1984 | Browne | 43/107 |
| 4,961,282 A | * | 10/1990 | Hoppe | 43/114 |
| 5,396,729 A | * | 3/1995 | Vejvoda | 43/114 |
| 6,161,327 A | * | 12/2000 | Thomas | 43/114 |

FOREIGN PATENT DOCUMENTS

JP 2001-69894 B1 * 3/2001

* cited by examiner

*Primary Examiner*—Darren W. Ark
(74) *Attorney, Agent, or Firm*—Hana Verny (57) ABSTRACT

A three-dimensional collapsible insect trap and assembly for capturing and monitoring insects comprising a collapsible carton container coated externally and internally. The carton container, collapsed for shipping and storing, is easily assembled into a three-dimensional trap. The trap comprises essentially a carton container suited to be assembled into a three-dimensional trap, a locking clasp and, optionally, an attachment means for attaching the trap to a place of insect infestation monitoring.

9 Claims, 10 Drawing Sheets

INSECT TRAP AND ASSEMBLY FOR CAPTURING AND MONITORING INSECTS

This application is a continuation-in-part application of Ser. No.: 09/044,586 filed on Mar. 19, 1998, pending, which is based on Provisional application Serial No. 60/040,839 filed Mar. 19, 1997.

BACKGROUND OF THE INVENTION

1. Field of the Invention

This invention concerns a one-piece three-dimensional collapsible insect trap and assembly for capturing and monitoring insects. The one-piece trap comprises a collapsible carton container coated externally with polyethylene and internally with glue or other adhesive and/or with pheromone or kairomone or other attractant. The carton container, collapsed for shipping and storing, is easily assembled into a three-dimensional trap which can be opened for monitoring a number of captured insects and closed with a top closure comprising locking clasp for further use. In the assembled form, the trap has a delta or diamond tunnel shape with an opening on each side permitting entry of the insect lured by the internal pheromone or kairomone coating, capturing of the insect with the glue coating and monitoring the number of captured insects by counting the total number of insect captured or number of insect captured on one grid square. The trap is protected externally from the weather conditions by its protective coating. The trap comprises essentially a carton container suited to be assembled into a three-dimensional trap, a locking clasp and, optionally, an attachment means for attaching the trap to a place of insect infestation monitoring.

2. Background of the Invention

The standard insect traps used for capture and monitoring of such insects as the codling moth, oriental fruit moth, peach twig borer, and most other fruit and vine insects, are not very effective and user friendly and typically the user is exposed, at least to some degree, to the insecticide of the trap. Similar is true with traps, insofar as they are available, to capture many different orders of insects including the Coleoptera, Diptera and Lepidoptera attacking row crops such as cotton and corn.

The foregoing insects create millions of dollars of damage every year in the U.S.A and other countries around the world. For example, the codling moth infests over two million acres of apples and pears globally, the oriental fruit moth infests more than 300,000 acres of peaches and nectarines; corn rootworm infests twenty one million acres of corn and thousands of acres of other row crops and the pink bollworm infest up to 4 million acres of cotton globally. Because of inaccuracy, inefficiency and impracticability of the currently available monitoring traps, in all cases of insect infestation of important crops, the use of insecticides is much higher than necessary. Sometimes, because of unavailability of accurate monitoring data, as many as fifteen applications of insecticide are used to control these insects when one or two may have been sufficient if the correct monitoring data have been available.

Therefore, the availability of practical, simple and reliable monitoring insect traps which would allow more accurate determination of a degree of the infestation and monitoring of the infestation would be very practical in determining an actual need for a number and frequency of insecticide applications.

It would, therefore, be important and advantageous to have available a safe, convenient, practical, simple, accurate and reliable insect monitoring trap which would be user friendly, efficacious in attracting and capturing the insect and practical for monitoring of a number of captured insects.

The current invention provides a new and improved one-piece, three-dimensional collapsible insect trap and assembly thereof having all the above attributes. The one-piece trap comprises several novel features making it extraordinarily practical and effective.

All patents, patent applications and publications cited herein are incorporated by reference.

SUMMARY

One aspect of this invention is a one-piece three-dimensional collapsible insect trap having improved design which provides a practical, efficient and accurate insect monitoring and capturing system.

Another aspect of this invention is a one-piece insect trap comprising a collapsible carton container coated externally with polyethylene or other protective coating and internally with glue or other adhesive and/or with pheromone, kairomone or other attractant applied on a surface of the imprinted monitoring grid.

Still another aspect of this invention is a carton container equipped with a locking clasp, collapsed for shipping and storing, which is easily assembled into a three-dimensional trap which, in turn, can be opened for monitoring a number of captured insects and closed with the locking clasp for further use.

Still yet another aspect of this invention is the insect trap which, in the assembled form, has a delta or diamond tunnel shape with two openings, one on each side, said openings permitting entry of the insect lured into the trap by the internal pheromone or kairomone coating, capturing of the insect with the glue coating and monitoring the number of captured insects by counting the number of insect captured on one square of the monitoring grid.

Still yet another aspect of this invention is the insect trap assembly comprising essentially the carton container and a locking clasp and, optionally, an attachment means for attaching the trap to a place of insect infestation monitoring.

Another aspect of this invention is a one-piece three-dimensional collapsible insect monitoring trap comprising:

a one piece flat carton container consisting of, before assembly to the insect trap, three panels separated by fold lines into a middle panel and two side panels, wherein said middle panel positioned between two side panels represents a front panel and a rear panel of a lower or bottom part of the assembled trap;

wherein said middle panel further comprises two protective flaps delineating two insect entry openings into said assembled insect trap, said entry opening formed by an end closure protective flap insertion into a female slot;

wherein said two side panels represent a front panel and a rear panel of an upper part of the assembled trap;

wherein the rear panel comprises a locking clasp component for a top closure of the assembled insect trap, said clasp component comprising a locking device consisting of a wire strip wherein a middle portion of the wire strip is incorporated horizontally into the rear panel and of two locking tabs extending horizontally sideways from the middle portion of the wire strip;

wherein the front panel comprises two openings for receiving the locking tabs of the locking clasp; and wherein, upon assembling, an assembled trap has an outer side exposed externally and an inner side coated with a glue, pheromone or kairomone or with the glue and pheromone or with the glue and kairomone and an upper part wherein the locking tabs are inserted into the openings on the front upper part thereby locking the carton into the three-dimensional trap; and wherein the inner side of the middle panel contains a grid for calculation of captured insects.

Another aspect of this invention is the locking clasp component comprising a locking device consisting of a wire strip wherein a middle portion of the wire strip is incorporated horizontally into the rear panel of the assembled trap and of two locking tabs extending horizontally sideways from the middle portion of the wire strip, said locking tabs insertable into two openings positioned on the front panel of the assembled trap.

Still another aspect of this invention is a one-piece three-dimensional collapsible insect monitoring trap assembly comprising:

a one piece flat carton container consisting of, before assembly to the insect trap, three panels separated by fold lines into a middle panel and two side panels, wherein said middle panel positioned between two side panels represents a front panel and a rear panel of a lower or bottom part of the assembled trap;

wherein said middle panel further comprises two protective flaps delineating two insect entry openings into said assembled insect trap, said entry opening formed by an end closure protective flap insertion into a female slot;

wherein said two side panels represent a front panel and a rear panel of an upper part of the assembled trap;

wherein the rear panel comprises a locking clasp component for a top closure of the assembled insect trap, said clasp component comprising a locking device consisting of a wire strip wherein a middle portion of the wire strip is incorporated horizontally into the rear panel and of two locking tabs extending horizontally sideways from the middle portion of the wire strip;

wherein the front panel comprises two openings for receiving the locking tabs of the locking clasp; and wherein, upon assembling, an assembled trap has an outer side exposed externally and an inner side coated with a glue, pheromone or kairomone or with the glue and pheromone or with the glue and kairomone and an upper part wherein the locking tabs are inserted into the openings on the front upper part thereby locking the carton into the three-dimensional trap wherein the inner side of the middle panel contains a grid for calculation of captured insects; and an attachment means incorporated or attached vertically into the upper part of the front panel, said means projecting through the front panel to the outside of the trap and functioning as an attachment and deployment means of the trap, or attachment means which is an extension of a support rod used for structural support of the assembled trap.

Still yet another aspect of this invention is a method for assembling a one piece insect trap suitable for capturing insect and for monitoring a number of captured insect, said method comprising steps:

a) folding two side panels along fold lines of a one-piece carton flat container consisting, before assembly to the insect trap, of three panels separated by fold lines into a middle panel and two side panels, wherein the middle panel positioned between two side panels represents a lower part of the assembled trap and wherein the middle panel further comprises a protective flap delineating an entry opening into said insect trap, said entry opening formed by an end closure protective flap insertion into a female slot;

wherein the two side panels represent a front panel and the rear panel of an upper part of the assembled trap;

wherein the rear panel comprises a locking clasp component for a top closure of the assembled insect trap, said clasp component comprising a locking device consisting of a wire strip wherein a middle portion of the wire strip is incorporated horizontally into the rear panel and of two locking tabs protruding horizontally sideways from the middle portion of the wire strip;

wherein the front panel comprises two openings for receiving the locking tabs of the locking clasp; and wherein, upon assembling, an assembled trap has an outer side and an inner side;

b) closing a top closure of the clamp component by inserting the locking tabs through the two openings positioned on the front panel and bending the tabs horizontally outward from the middle portion of the wire of the locking device thereby locking the trap into its diamond or delta shape; and c) inserting the end closure protective flap into female slots positioned the middle panel of the one-piece configuration thereby forming two entry openings for insect.

Another aspect of this invention is a method for monitoring of a number of insects comprising steps of unlocking a locking device of an assembled trap and counting the number of insect captured on one square of the monitoring grid imprinted on the middle panel of the inner side of the carton container coated with glue.

Still another aspect of this invention is a method of use of a one-piece assembled trap as a non-poisonous insect monitoring system useful in detecting and monitoring the population of insect of order of Lepidoptera, Diptera and Coleoptera, monitoring a crop infestation and/or capturing the insect.

BRIEF DESCRIPTION OF DRAWINGS

FIG. 2 also shows partially exposed inner cavity showing protective flap, end closure and a seam.

FIG. 5 further shows a rim of the rear panel folded over the rim of the front panel.

DETAILED DESCRIPTION OF THE INVENTION

The current invention provides a novel and improved one-piece three-dimensional collapsible insect trap and assembly for capturing and monitoring insects.

I. One-Piece Three-Dimensional Insect Trap

A one-piece three dimensional insect monitoring trap has an unique design and is simple, practical and easy to use. The trap's novel design permits its shipping and storing in a collapsed form. The trap's novel locking clasp permits easy assembling and handling in the field and permits a reuse after monitoring and/or emptying the trap. One trap, thus, may be used for monitoring the insects for one or more monitoring periods and may even last for several seasons. The trap is convenient, safe and efficient.

A. Trap Design

A one-piece three-dimensional collapsible insect monitoring trap comprises a one piece flat oblong carton consisting of, before assembly to the collapsed or fully assembled insect trap, three panels separated by fold lines into a middle panel and two side panels.

The middle panel is positioned between two side panels. When fully assembled into operable trap, the middle panel represents a lower or bottom part of the assembled trap and the two side panels represent a front panel and a rear panel of the upper part of the trap. The middle panel is further separated into two parts divided by and each comprising a middle section suitable to be folded to form a seam. For assembling the trap the middle section is folded along the three folding lines to form a seam protruding outwardly from the bottom of the trap. This feature permits locking of the protective flaps via the end closures inserted into female slots.

The middle panel comprises two protective flaps which delineate two entry openings for insect fly-in into the fully assembled trap. The two entry openings are formed by insertion of an end closure protective flap into a female slot formed by the folded seam.

Both side panels further comprise a rim separated from the side panels by fold lines. When the trap is assembled and locked with a locking clasp, these two rims are folded along their respective fold lines and brought together to permit engagement of the locking clasp. The rim of the rear panel comprises a locking clasp component for a top closure of the assembled insect trap. The rim of the front panel comprises two openings positioned as a mirror image of the locking clasp component.

Side panels may additionally have scoring lines, i.e, lines pressed into the carton. These scoring lines provide additional support for the structural strength of the assembled trap exposed to the environmental conditions such as wind or rain. In this respect the support rod has been found to also add a structural support in these conditions.

The locking clasp component consists of a strip, preferably a wire strip, wherein a middle portion of the wire strip is incorporated horizontally into the rim of the rear panel and wherein two side portions of the strip serve as two locking tabs. The two locking tabs extend horizontally sideways from the middle portion of the wire strip. The two openings positioned on the rim of the front panel receive the locking tabs of the locking clasp.

Upon assembling, the assembled trap becomes a container which has an outer side exposed externally to an environment and an inner side forming a cavity for capture of insect. The outer side of the trap is coated with a protective agent. The inner side of the container is coated with an adhesive and/or insect attractant. The inner side of the container optionally further comprises an imprinted grid for insect monitoring.

The trap further optionally comprises a support rod which permits the trap to be easily unfolded from its collapsed into the operable trap and also serves as attachment means for attaching the trap onto the branch, stake or other structure.

For storage and shipping, the trap is manufactured from the flat oblong carton into its preassembled collapsed form. In this form the locking clasp is already engaged and the trap is ready for functional fully operable assembling.

The assembling of the trap comprises pulling the rod upwards thereby folding the trap along the folding lines creating the three-dimensional container, bringing together rims of the front and rear panel of the upper part of the trap and inserting the locking tabs of the rear panel into the openings of the front upper part thereby locking the carton into the three-dimensional trap.

In the assembled form, the trap has a delta or diamond tunnel shape with an opening on each side permitting entry of the insect lured by the internal coating with the insect attractant, capturing the insect with the adhesive coating and monitoring the number of captured insects by counting the number of insect captured on one grid square.

B. A Locking Clasp

One novel feature of the current trap is a locking device, herein called clasp which permits the top closure of the flat carton into collapsed or fully assembled functional trap. The locking clasp is easily opened and closed. When the clasp is closed, the trap acts as a container for capture of the insects. When the trap is opened, it unfolds into its flat preassembled oblong carton. This permits emptying the trap and counting the number of insects caught in the trap. After the insect is removed, the clasp is again engaged and the trap is once again in its functional form. The main function of the locking clasp is thus its ability to be easily opened before and closed after the insect monitoring.

The locking clasp improves the functionality and usefulness of the current trap, however, it may also exist as a stand alone feature and may be used to improve the usefulness of many other existing trap designs leading to higher efficacy, greater efficiency and convenience in using these traps, and further resulting in lower user cost as well as lower cost of manufacturing for most trap designs.

The new clasp, for example, can be used to improve existing delta and diamond trap designs by allowing for easy opening or closing, insect counting, and recounting and disposability. Some such designs use a disposable glued insert as a trapping surface which may be disposed of and substituted with the new insert while still preserving the trap. The clasp component, thus, allows the existing trap to act as the protector of the disposable insert and therefore eliminates work related to inventory and servicing.

Other trap designs for which the locking clasp component may be used are, for example, straight panel traps such as the Trècè, Inc., Pherocon™ V trap for scale insects, and the Pherocon AM trap for various fruit fly species or the corn rootworm. Furthermore, straight two sided sticky cards or paper used for fly traps may also be improved with the new design.

These traps when used with the new clasp component are improved for monitoring of insects, such as the codling moth, oriental fruit moth, peach twig borer, and most other fruit and vine insects. Furthermore, the trap has been found to have also improved properties in protecting row crops, such as cotton and corn, from many different orders of insects including the Lepidoptera, Diptera and Coleoptera.

There are several other advantages connected with the use of locking clasp. The clasp aids in assembly of the trap, increases the accuracy of data collection, decreases cost of manufacturing, decreases the cost of overall use, and reduces contact of the user with glue. The top closure of the trap also allows the user to change and dispose of glued components quickly and easily anytime during the season.

C. Shipping and Storing

The trap is manufactured as a flat oblong carton coated on both sides and a locking clasp, and typically also comprising a support rod. The one-piece three-dimensional trap comprises, in its preassembled form, a flat oblong carton of dimensions from about 1:2 to about 1:5/shorter sides:longer sides.

One side of the carton is coated with a protective agent, such as polyethylene, plastic, wax or any other suitable protective means. The other side is coated with an adhesive agent, such as glue, sticky substances, waxes, oils, oil mixtures or any other adherent which permits the insects to be caught. In addition to the adhesive, this side is also preferably coated with an insect attractant, such as pheromone, kairomone, food attractant, fragrance and the like. Each coating may be applied individually or in combination with any other coating.

The support rod, preferably a flexible metal or plastic wire, is attached to and extends from the center of the middle panel of the flat carton. The rod is wrapped around the collapsed trap or is left extended depending on the packaging.

The locking clasp, which is preferably a plastic or paper strip comprising one, two or more wire or any other strengthening means, is in one embodiment prefabricated into the flat carton before the carton is assembled as a collapsed trap. Specifically, the middle part of the strip is embedded into the rim of the rear panel with two locking tabs extending therefrom. Thereafter, the locking tabs are inserted into the two openings positioned in the rim of the front panel and horizontally locked in position. In alternative, the locking clasp may be a stand alone entity suitable for improvement of existing traps or in another embodiment where the wire strip is inserted into the slits in the rim of the rear panel and the locking tabs are inserted through the openings in the rim of the front panel.

To convert the flat carton into the collapsed trap, the flat carton is folded along its folding lines into the collapsed form for shipping and storage with no exposed internal coating, that is the adhesive and insect attractant coated surfaces are fully protected.

The collapsed trap can be completely assembled into three dimensional functional operating unit within minutes. The trap is shipped collapsed and ready to be expanded and attached to a place of infestation.

D. Attachment Means

Optionally, the trap also has the attachment means for attaching the trap to the tree, bush, branches or to the other structures where the trap is to be placed. The attachment means may be a completely separate entity, may be prefabricated into the flat carton, the support rod may be used for this function and/or any combination thereof may be used for this function. It is to be understood that the locking clasp typically does not serve as the attachment means but in rear instances may be used as a holding means for such attachment means.

E. Insect Monitoring

Due to its novel design, the trap of the invention is specially useful for monitoring a number of insects. The locking clasp permits holding the trap in its three-dimensional shape. The internal coating of the trap lures and attracts the insects inside of the trap where the insects is caught and adheres to the adhesive. The inner sides and/or the middle panel are further imprinted with a grid for calculation of captured insects.

Monitoring of the number of insect, which is extrapolated to insect infestation, is performed in certain predetermined time periods. For monitoring, each trap unit which is easily opened for insect observation and monitoring is opened and the number of insect as a total is calculated or the number of insect per grid is determined. Then the trap is emptied and may as easily be closed for further use.

In another embodiment, the locking clasp is not fabricated into the flat carton but is attached to it loosely as a separate strip through two sets of openings. One set of openings situated as described above in the rim of the front panel and the identical set of two opening, preferably slits, situated in the rim of the rear panel. For this embodiment, upon assembly of the trap into collapsible or fully assembled trap, the strip is inserted though both sets of openings with a middle portion of the strip facing externally from the rim of the rear panel and the locking tabs extended horizontally from the rim of the front panel after being inserted though the openings in both rims of the rear and front panels. It is understood that the strip may be equally inserted through the front panel first in the same fashion as described.

In this embodiment, the flat carton may be disposed of and substituted with another one in situ so that the locking clasp with attachment means remain and the carton part is replaced.

Trap field assembly is very efficient. The user simply pulls the bottom outward pushing in protective flaps to lock the end tabs and the trap is assembled. The user never touches the adhesive or attractant.

The trap top closure increases the accuracy of the collected data. The top closure allows for machine application of the coating on the inner side of the flat carton. The mechanically applied adhesive and attractant, such as glue and/or pheromone, is evenly distributed and has a consistent thickness. With such accurate coating, the field data is more consistent and makes the Pest Control Advisor's insect population predictions more reliable. Utilizing the precise data, the Pest Control Advisor(PCA) maximizes the effective use of pesticides by introducing them at the exact time and in the needed amount in the season to ensure greatest insect mortality.

Another improvement of accurate data collection arises during gathering of the field data. The top closure allows the PCA to open the trap and count the insects without guessing.

The adhesive can also be dusted or stirred to increase the life of the coated surface. Stirring the adhesive removes the layer of dust deposited on the its surface due to windy conditions. This dust layer prevents the insects capture and, therefore, distorts and affects the capture data and the recommendations for pest control.

The PCA must be able to remove the insects periodically. Having the ability to open the trap assists the PCA with this task. For example, when the PCA opens the trap, it remains hanging by the top closure. This allows the PCA to use both hands for insect removal, without holding the trap. The top closure prevents the trap falling to the ground and the PCA can perform other tasks, such as writing data and analyzing the sex and number of the trapped insects, at the trap site.

Finally, the trap is reusable after the PCA checking. While PCA can check the trap thoroughly, the trap can be closed for continued use. This allows the PCA to continue to use undamaged or unexhausted traps.

An additional advantage of the current trap is the increased efficiency of counting and identifying the insects captured. This results in less time needed to check each trap. This feature is critical for insect monitoring since the time required to check traps in the area is of greatest concern to Pest Control Advisors.

Further, the top closure adapts to many insect habitats. Different environments require different types of hanging characteristics. One environment may need to withstand extreme sunlight, wind, humidity, rain, etc., while the other environment may need to be more aesthetically pleasing. The top closure works in both types of such situations.

F. Other Advantages

The top closure reduces the labor cost of trap production. The top closure permits the use of an automatic, accurate and fast coating machine which accelerates coating application. This procedure significantly reduces the labor costs connected with the manufacturing of the trap.

Also, the top closure allows for the trap to be shipped in a smaller package by packaging the trap as a flat collapsed product. The packaging takes less time, requires less packaging material and less space for storing and shipping also leading to significant cost savings to the manufacturer and end users.

The locking clasp insures that the overall shape of the trap is maintained in high wind and rain or under irrigation conditions. All other paper and to some extent also plastic trap designs have the problem of warping or tearing in such conditions. The trap of the invention has been tested and shown to be able to withstand these conditions.

The new design was proven to be effective monitoring and capturing system. The design includes the following features important for the trap performance, such as, for example, the shape of the openings for insect fly-in, the attractant and adhesive deposited on the inner side of the trap for capturing insects, the system for hanging the trap on a tree, the materials used for trap construction, etc. These features incorporated into the new trap make the trap sturdier and more user friendly.

The trap is easy to use by simply pulling down the lower portion of the trap, folding it and locking the ends, bending the factory provided and/or installed hanger wire or other attachment over a tree branch and giving it a twist. After this simple manipulation, the trap is completely ready to capture insect. Likewise, the trap can be easily attached to hanger wire already fastened to a tree limb.

The trap is sturdy and durable. The unique support rod and locking clasp and tab system holds the end-walls upright. The trim on the corners reduces the tendency of the end-walls to spring back to their original, flat, position. The vertical, inward facing seams prevent sagging and distortion of the flyin openings. The overlapping ridge of the rear panel rim along the top of the trap adds and prevents rain and/or irrigation water from traveling down into the glued area. The locking clasp keeps the top portion securely in place. The trap retains its shape and function after prolonged exposure to high velocity winds, driven water, etc.

The trap is easy to open, close and see inside. The unique locking clip makes opening and closing easy. No tools are required. Opening requires just two quick folds of the smooth, flat wire strip and the trap automatically drops open and the entire inside glue surface is in full view. After inspection, the bottom can be returned and locked in working position with easy motions. There are no loose parts and nothing to line-up. Once closed, the trap stays closed. Grid printed on the inside of the trap, seen in FIG. 6, facilitates the tally and enable easy record keeping.

Trap is easy and economical to manufacture. In its most preferred embodiment, it is made from relatively inexpensive, light weight, durable, clear plastic coated paper milk carton stock that can be easily and automatically cut to blanks that include the many unique shapes, creases, tabs, slots, etc.

G. Detailed Description of Drawings

The unique design of the trap of the invention is visible and illustrated in FIGS. 1–7.

Figure 1:
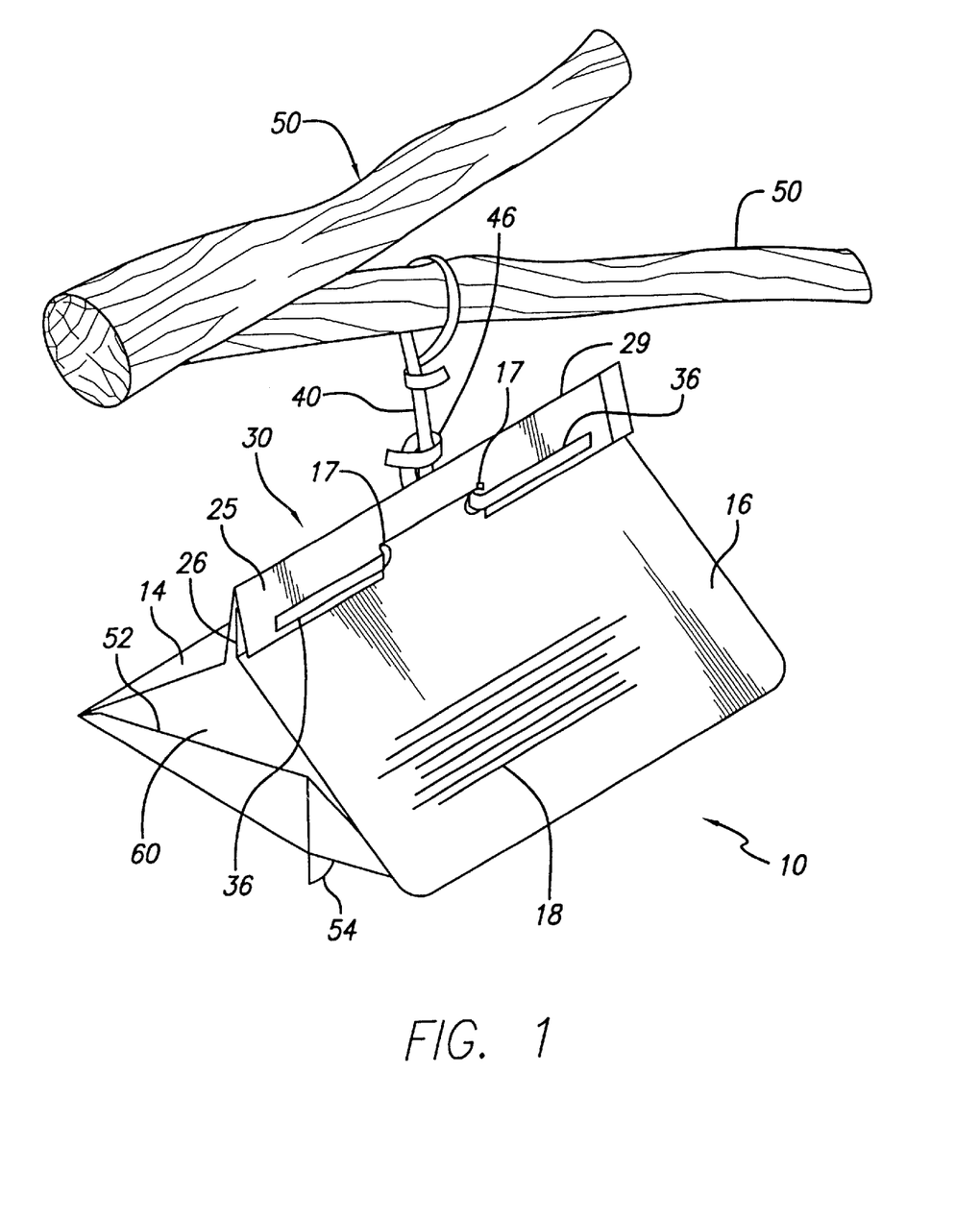
FIG. 1 is a front and partial side view of a one-piece three-dimensional assembled trap seen attached to a tree branch showing a front panel, top closure, two locking tabs of the locking clasp, protective flap and a separate attachment means.

FIG. 1 is a front and partial side-view of a one-piece three-dimensional collapsible trap 10 seen assembled and attached to the tree branch 50 through an attachment 40. The attachment 40 seen in FIG. 1 is a strip, preferably wire strip inserted into an opening, preferably a slit opening 44 in the center of the trap's rim 25. One end of the strip is tied around the branch 50. The second end of the strip is tied as a loop 46 around the vertically extended strip 40. In alternative, as seen in FIG. 3, the attachment means may be a simple wire attached to the trap, preferably at the rim 25. In another embodiment, the attachment means may be a support rod 20, as seen in FIG. 2.

The one-piece trap, as seen in FIG. 1, consists of a carton folded into a delta or diamond tunnel configuration wherein the carton is coated externally with a protective agent 18, such as polyethylene, plastic or wax, and internally with an adhesive agent 19 (FIG. 6), such as glue, oil or oil mixtures, and/or with the insect attractant, such as pheromone, kairomone or other bait. Typically, the current trap is made of milk carton container imprinted on the internal surface with a grid 70 (FIG. 6) and coated with an internal coating 19 of glue and pheromone.

Figure 2:
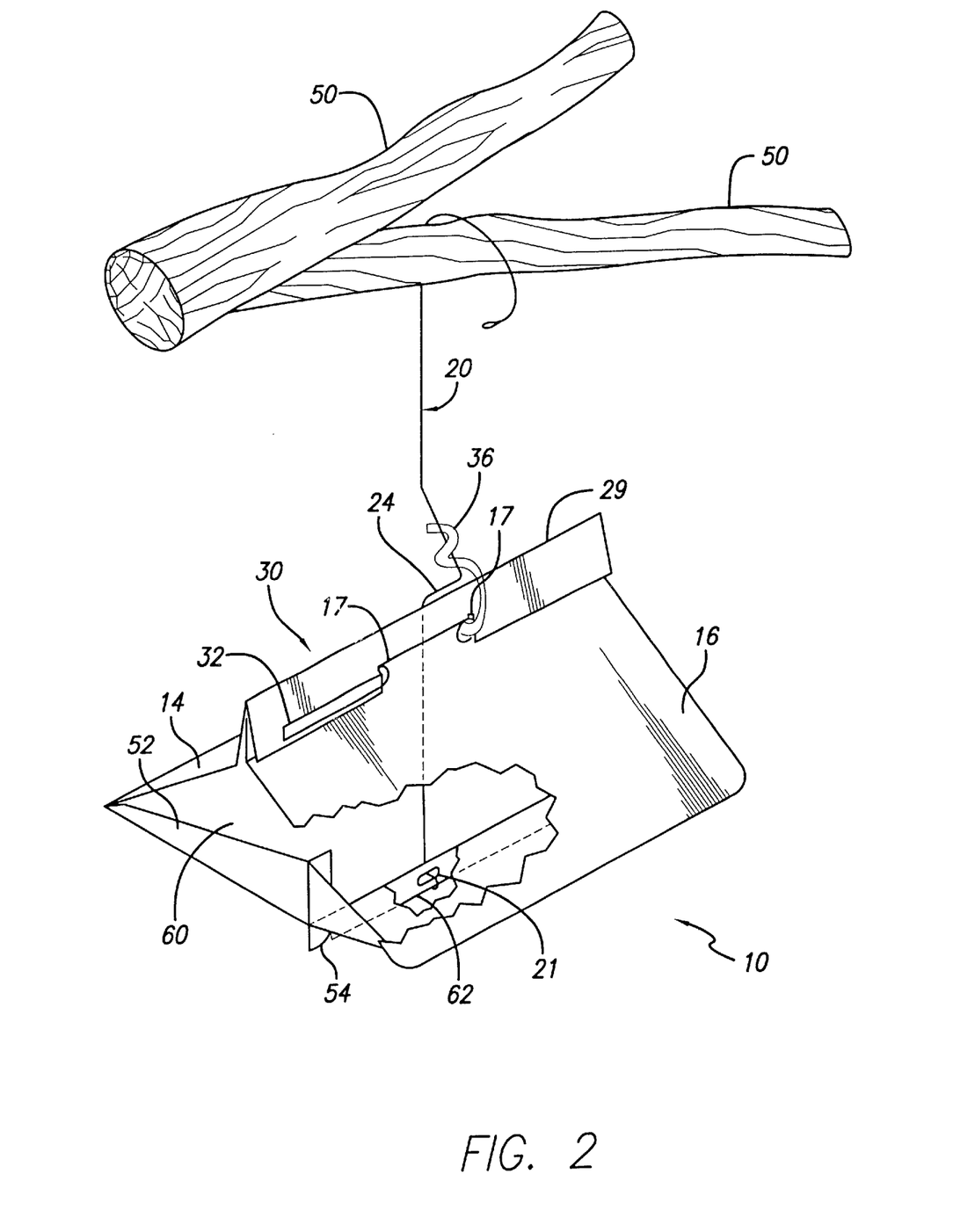
FIG. 2 is a front and partial side view and partially exposed inner cavity of a one-piece three-dimensional assembled trap with a support rod functioning also as an attachment means for attachment to a tree branch wherein one of the tabs of the locking clasps serves as attachment for the support rod.
Figure 3:
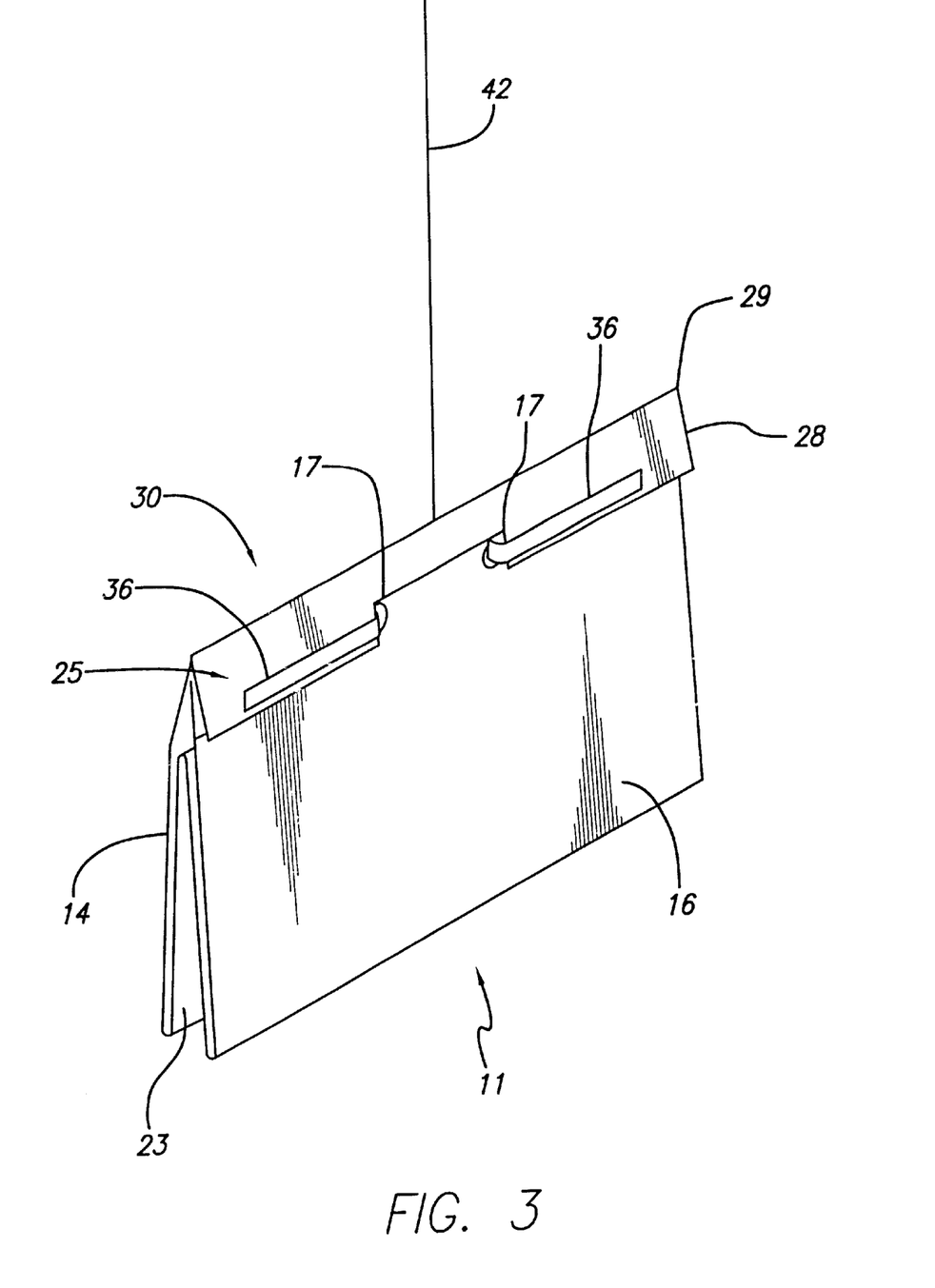
FIG. 3 illustrates a trap assembly collapsed for shipping showing a front panel and two tabs of a locking clasp locked in place through two openings in the front panel, and a wire hanger used as an attachment means.

The trap is conveniently provided with a ridge-like top closure 28 comprising a rim 25 of the rear side panel 14 and a rim 26 of the front panel 16, both rims held closed with a locking clasp 30 comprising a locking strip 32, preferably a coated wire strip seen in FIG. 2. The single or double wire strip 32 comprises a middle portion 34 (FIG. 5) and two locking tabs 36 extending horizontally therefrom.

Figure 6:
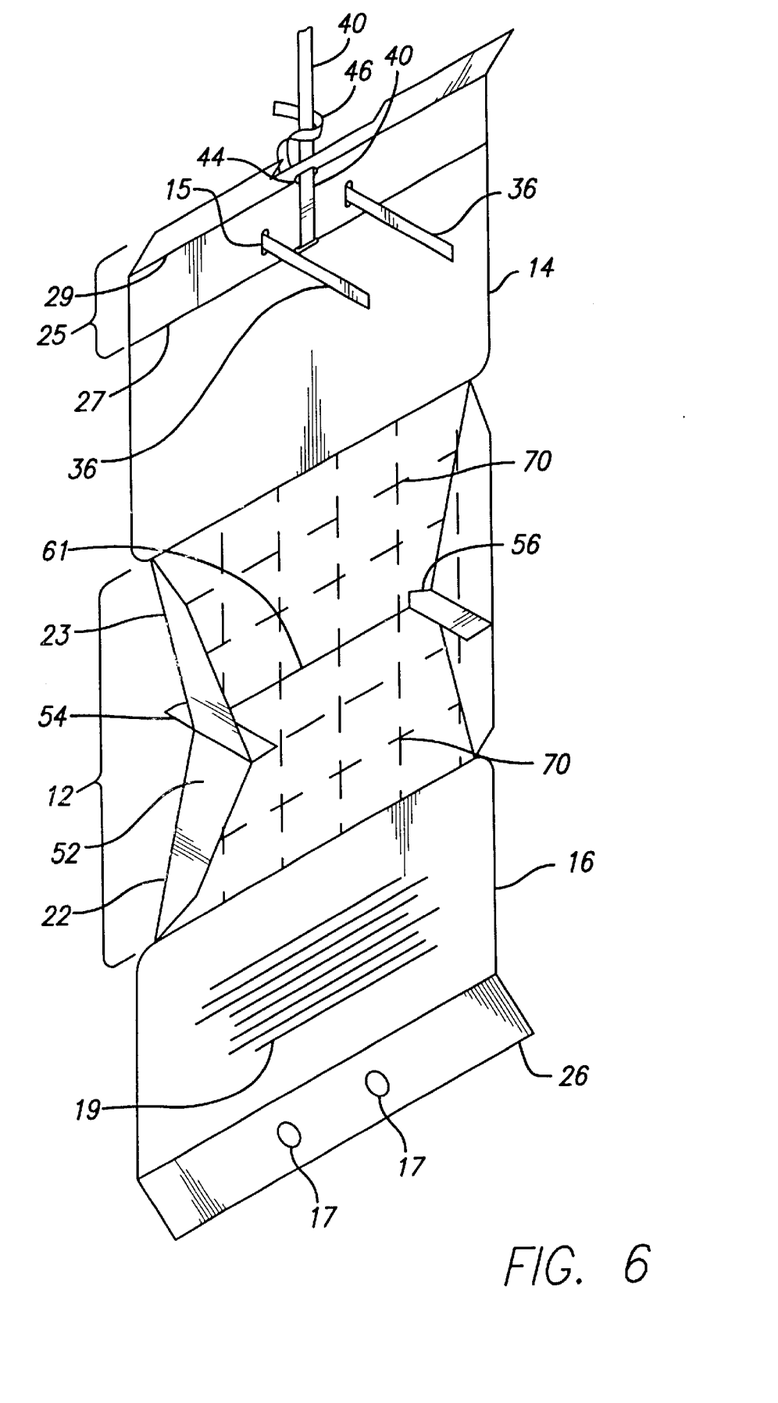
FIG. 6 depicts an inner side and three panels of an open unfolded unassembled one-piece trap showing a monitoring grid imprinted on the middle panel and two tabs of the locking clasp extending from the rear panel inward toward two openings located on the front panel.

The top closure 28 is formed by folding the rim 25 along its two folding lines, namely the first folding line 27 (FIG. 6) and the second folding line 29 to form a protective cover overlapping the rim 26 of the front panel 16 as a ridge. The rim 25 is then folded over rim 26 and the locking tabs 36 of the strip 32 are inserted into openings 17 positioned on the rim 26 of the front side panel 16. The slit openings 15 which are positioned on the rim 25 of the rear side panel 14 are positioned in a mirror like fashion to the openings 17. The locking tabs 36 are then bended horizontally sideways. The locking tabs 36 in the open position are seen in FIG. 6. The locking tabs 36 in the locked position are seen in FIGS. 1 and 2.

Also seen in FIG. 1 is the end closure tab 54 and the protective flap 52, herein seen on the left side facing the trap. The end closure 54 and the protective flap 52 are duplicated on the right side of the trap. These features are important for the three-dimensional design of the trap as well for its function. The size and shape of the insect entry opening 60 is set by the protective flaps 52. The integrity of the entry opening 60 is central to the use of the trap for insect monitoring since changing the size and shape of the opening affects the capture rate of the trap and therefore compromises the proper function of the trap in monitoring the insects. It is essential that the size and shape of this opening be maintained under a wide range of severe conditions which include rain, humidity, drought and severe winds. The protective flaps 52 are also essential for reinforcing the trap structure under these severe conditions.

FIG. 2 is the side and partial front view of the assembled trap with partially-exposed inner cavity. FIG. 2 also illustrates an alternative method of attaching the trap to the tree or other support using a support rod as an attachment means.

The one-piece three-dimensional assembled trap 10 shown in FIG. 2 is equipped with a support rod 20 functioning also as an attachment means for attachment to a tree branch wherein one of the tabs of the locking clasps serves as attachment for the support rod. Support rod, typically a strong metal wire 20, used in this embodiment also as an attachment means, is a solid wire which extends through the trap and is attached to the middle bottom panel a support rod attachment point 21 in the middle of the seam 62. The support rod 20 has an offset bend 24 which prevents the front side panel 16 and rear side panel 14 from sliding up on the wire which would allow the trap to collapse. In this embodiment, one locking tab 36 is wrapped around the support rod 20 to prevent the front and rear side panels from sliding down. This type of attachment is particularly useful for windy and wet conditions.

The support rod 20 is attached to the seam 62 at a point 21 to the middle panel 12 forming the bottom of the trap 10 and extends vertically through the center of the trap 10, through the rim 25 of the top closure 28 of the assembled trap. The primary function of the rod 20 is to provide additional structural support to the trap 10 during the exposure of the trap to the environment, particularly to rain and wind. However, in this capacity, it may be advantageously utilized also as an attachment means for attaching the trap to the place where the trap is desired to be located. The support rod 20 is preferably a flexible but strong wire which may be coated with. any protective material or it may be a plastic coated wire strip comprising one or more wires or it may be any other structure which would support the trap structurally and be strong enough to provide such support. It is to be understood that while it is preferable to incorporate the support rod into the trap design, such rod is not an essential part of the design and the trap 10, seen for example in FIG. 1, functions well without this feature.

FIG. 2 also shows partially exposed inner cavity showing a protective flap 52, insect entry opening 60 and engaged end closure tabs 54 inserted into female slots 56 (FIG. 4) formed by the folding of a seam 62. Also seen are the front panel 16 of which the rim 26 is covered with folding ridge-like rim 25 of the rear side panel 14. The locking clasp 30 comprises locking tabs 36 of which one is seen in locked position and the second locked around the support rod. In this embodiment the locking strip is a plastic wire strip 32 comprising a wire for added support. The tabs 36 are inserted through the openings 17 positioned on the rim 26 (FIG. 7) of the front panel.

The collapsed trap 11, shown in FIG. 3, is ready for shipping and storing, however, it may be readily opened to its expanded three-dimensional shape as shown in FIGS. 1 and 2. FIG. 3 illustrates yet another alternative attachment means by using a separate single solid wire hanger 42 attached to the trap at the rim 25 of the rear side panel. A single solid wire. hanger 42 shown in FIG. 3 permits easy collapsing of the trap, however, the trap can also be collapsed with the alternative attachment means as described above.

In the FIG. 3, the collapsed trap 11 is shown to possess a locking clasp 30 with locking tabs 36 already inserted in the openings 17 and in the locking position. The rim 25 of the rear side panel is folded protectively over the rim 26 of the front side panel with visible second folding line 29. Top closure 28 of the trap 11 includes the rim 25 protectively folded over and closing the inner cavity 60 of the trap for protection against rain, wind, dust, etc. Also partially visible is the bottom rear part 23 of the middle panel collapsed inward.

Referring to FIGS. 1, 2 and 3, the collapsed trap 11 is easily expanded into operating trap 10 by pushing the front side panel 16 and the rear side panel 14 apart to uncover the seam 62, folding the middle line 61 separating the seam portions 64 and 66 (FIG. 7) and pulling it down to expand the trap, locking the end closures 54 into the female slot 56, bending the locking tabs 36 horizontally into locking position or, in alternative as seen in FIG. 2, locking one tab 36 and wrapping the second locking tab 36 around the support rod 20. During the process of expanding and assembling the trap, the user does not touch any internal surface of the trap since all coated surfaces are on the inside.

Figure 4:
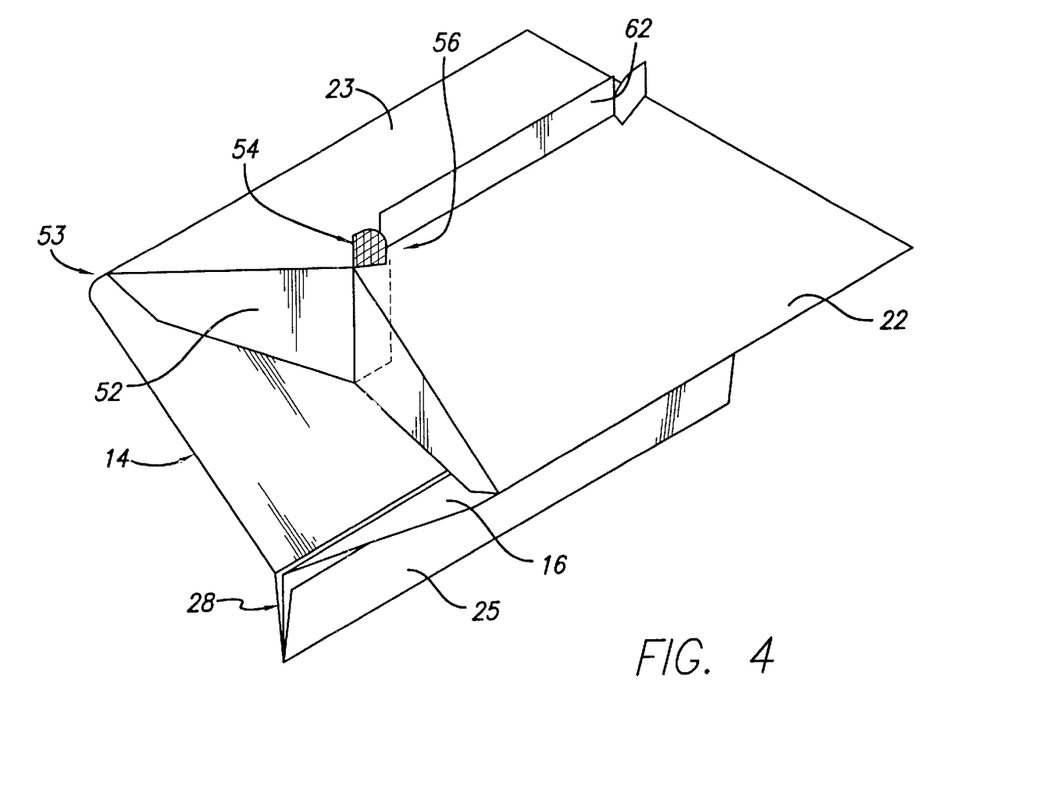
FIG. 4 is a bottom and partial side view of a one-piece three-dimensional assembled trap showing the end closure, protective flap, seam and a female slot.

FIG. 4 is a bottom and partial-side view of a one-piece trap showing in detail the end closure component 53 comprising the seam 62, protective flaps 52 and end closure tabs 54 inserted into the female slots 56. A position of the protective flap 52 vis-a-vis the end closure tab 54, seam 62, bottom rear panel 23, bottom front panel 22, rear side panel 14 and front side panel 16 is clearly illustrated. The end closure tab 54 is a novel locking tab mechanism. As the end closure protective flap 52 is lifted/pushed into place, the tab 54 inserts into a female slot 56 and by moving slightly to the side is locked into place. This allows the trap to be opened to its operating form as well as to be opened for observation and maintenance, without compromising the integrity of the locking clasp.

Figure 5:
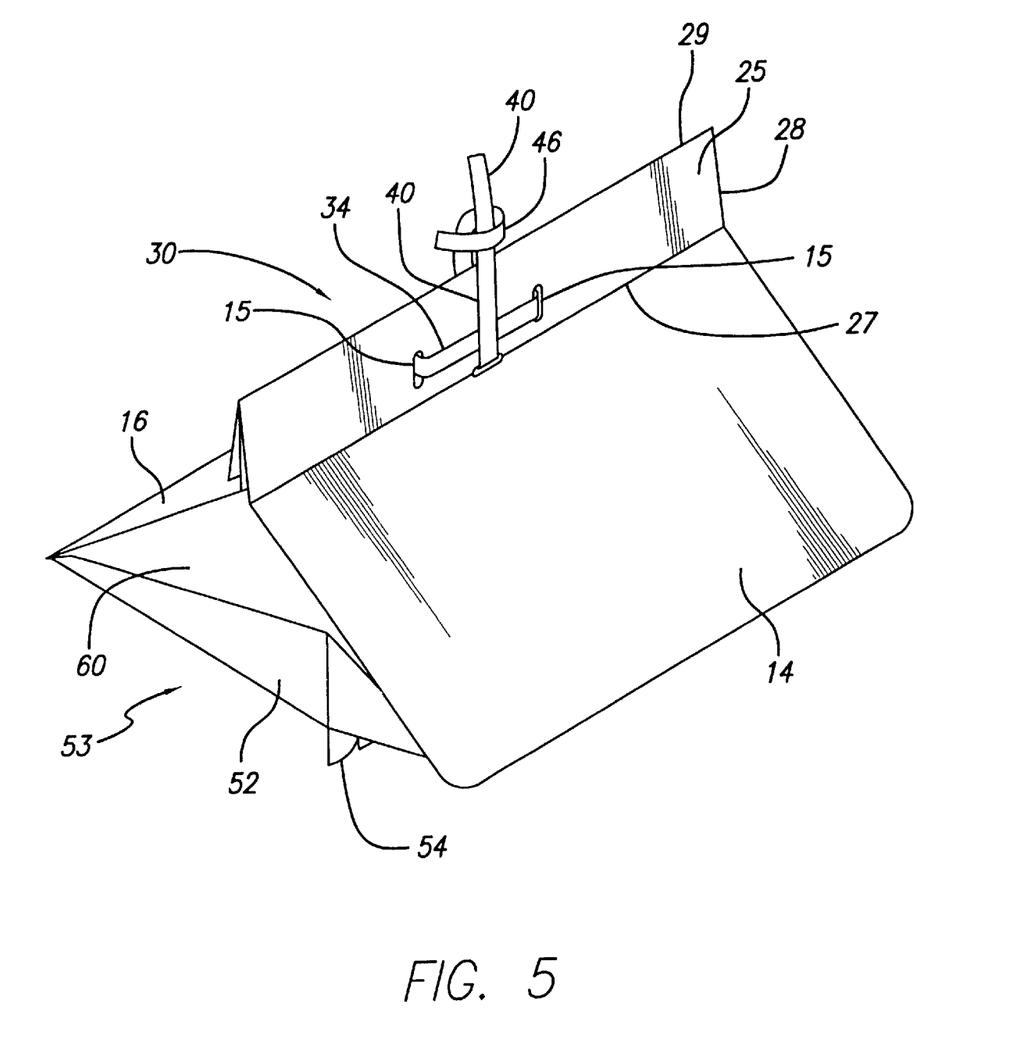
FIG. 5 is a rear and partial side view of a rear panel of a one-piece assembled trap showing a placement of a middle wire strip of the locking clasp and a plastic strip functioning as an attachment means an attachment means.

FIG. 5 is a rear and partial-side view of a one-piece trap showing position of placement of the middle portion 34 of the locking clasp 30 within the rim 25 of the rear panel 14. The strip 32 is inserted through the slits 15 with two locking tabs 36 (not shown) protruding therefrom to ward the front of the trap. Also seen is the first folding line 27 and the second folding line 29 of the rim 25 folded like a protective ridge over the rim 26 (not shown) of the front side panel 16. The end closure 53 shows inwardly pushed protective flap 52 and end closure tab 54 inserted into the female slot 56.

Additionally, FIG. 5 illustrates another type of attachment means which in this instance is completely separable from the trap. This attachment means is a plastic coated double strand wire 40 seen inserted through the opening 44 for the insertion of the plastic wire 40. The plastic wire is locked in place by bending one of its end and forming a loop 46 around the attachment wire 40 to prevent the wire 40 from falling out when locking tabs 36 are extended for opening the trap. The opening 44 is positioned in the center of the rear panel first folding line 27 so that the attachment of the trap remains intact when the trap is opened and the front side panel is unfolded for emptying the trap.

FIG. 6 is a flat (open) one-piece trap showing the internal side of the trap 10. FIG. 6 clearly shows positions of the middle panel 12 and front side panel 16 and rear side panel 14. As seen in FIG. 6, the middle panel is divided into two parts, bottom front panel 22 and bottom rear panel 23. These two panels are separated by the line 61 which represents a seam 62 (not visible on the internal side) in an assembled position where the two adjacent middle portions 64 and 66 of the two panels 22 and 23 are pressed together and protrude as the seam 62 outwardly. The protective flap 52 is seen in position as when the trap is assembled and closure tab 54 is inserted into the female slot 56. The grid 70 is imprinted into the middle panel but may also be imprinted on the internal sides of the front side panel 16 and the rear side panel 14. The position of the rim 26 and openings 17 on the front side panel 16 is shown as well as the coating 19 of the internal surface with the adhesive and/or attractant. The coating is not limited to the front side panel but the same or different coating is preferably applied over the whole internal surface. As illustrated, the rim 26 with openings 17 are placed in the mirror-like image to the slit openings 15 placed on the rim 25 of the rear side panel so that when the trap is folded, the locking tabs 36 are directly opposite of the openings 17 and are easily inserted into openings 17 and locked. Position of the rim 25 and the first folding line 27 and the second folding line 29 are also seen.

Additionally, FIG. 6 shows the placement and attachment of the plastic strip 40 inserted through the slit 44 and locked with a loop 46.

Figure 7:
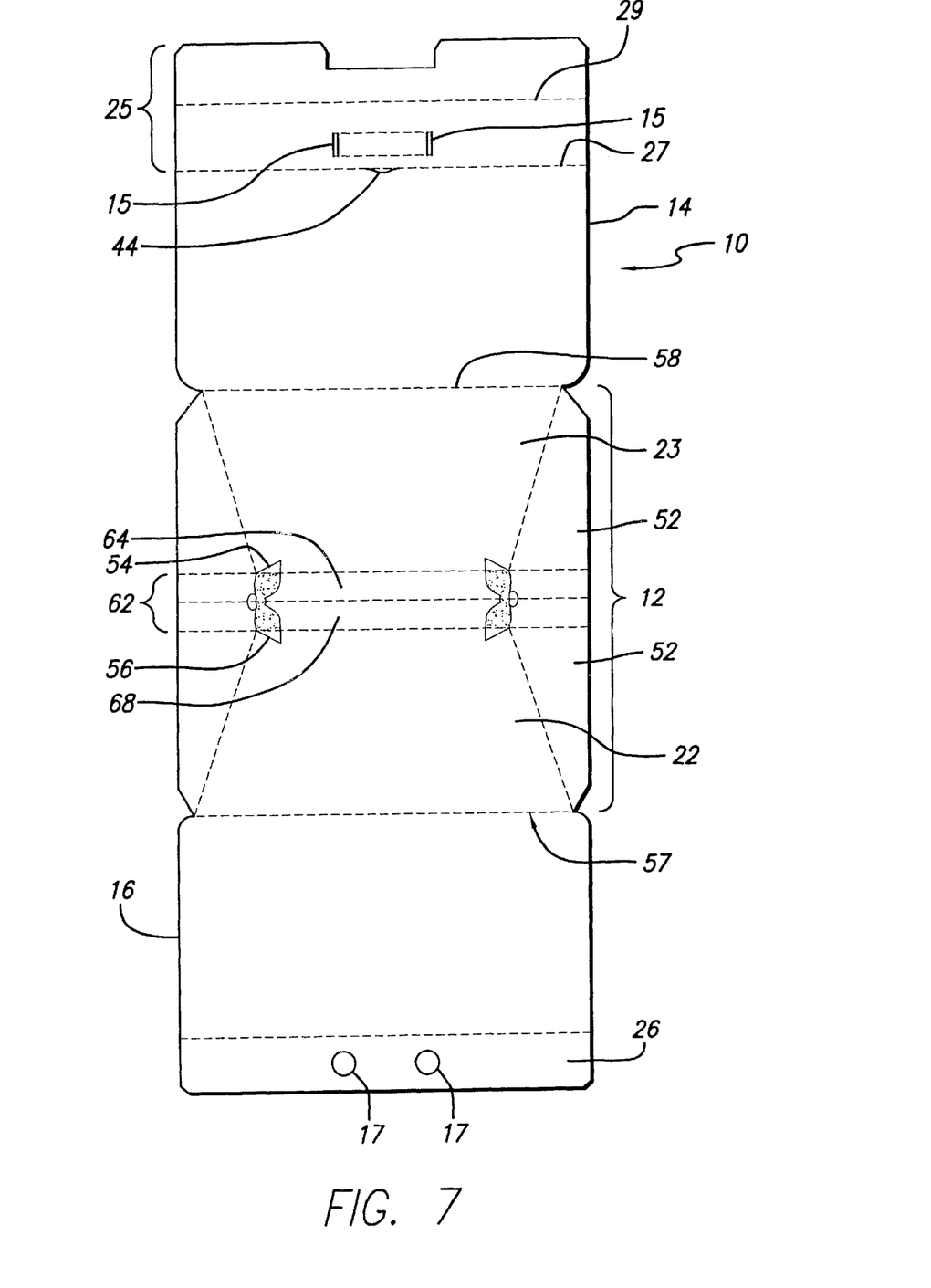
FIG. 7 depicts an outer side and three panels of an open unfolded unassembled one-piece trap showing fold lines and cuts for folding the trap to its final design.

FIG. 7 depicts an outer side and three panels of an open unfolded unassembled trap in flat pattern showing the fold lines (dotted) and cuts (solid) for folding the trap to its final design. The front and rear side panels 16 and 14 are folded up along the folding lines 58 and 57 and locked together with the locking clasp of which only the middle portion 34 is visible in this Figure. Also seen are the first and second folding lines 27 and 28 of the rim 25 for formation of top closure 28 (FIG. 1) with slits 15 and slit 44 for attaching the attachment means. The front side panel shows the rim 26, folding line 31 and two openings 17. optionally, there may also be present a slit 44. The middle panel 12 shows two bottom side panels 22 and 23 delineating seam 62 with two adjacent middle portions 64 and 66 of the two panels 22 and 23. The seam 62 is shown unfolded with the end closure tabs 54 and female slot 56 clearly visible.

To test the trap of the novel design, field trials were performed to test the new trap alongside of previously used traps. The field trial were performed under comparative controlled conditions.

Figure 8:
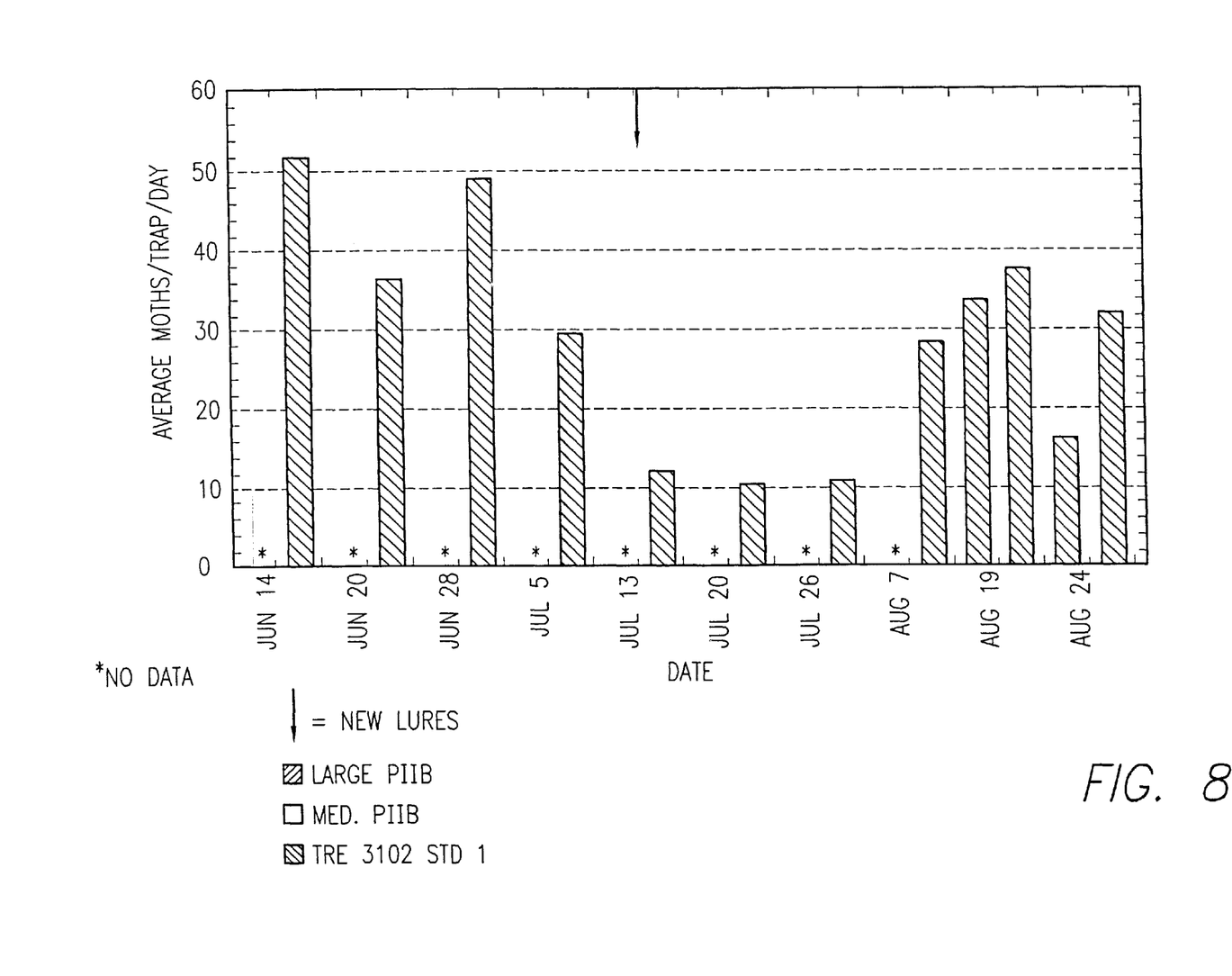
FIG. 8 is a graph illustrating trap captures of oriental fruit moth (OFM) using the improved trap of the invention.

FIG. 8 is a graph illustrating trap catches of oriental fruit moth using the three-dimensional collapsible trap of the invention. The FIG. 8 illustrates a field trial using the trap of the invention to capture oriental fruit moth and compared to standard Pherocon 1C and Pherocon II medium size and large size traps. Pherocon traps and baits are commercially available from Trece Inc., Salinas, Calif. Lures were those used in Pherocon Standard trap. Lure was changed in 4 week intervals. Liner was changed in 4 weeks intervals or when soiled. The traps were placed at a density of one trap per 0.75 acres at height of six feet. Traps were placed in the almond crop field.

Results are expressed as average moths count per trap per day. As seen in FIG. 8, there were seasonal changes in counts. In June the counts were generally higher than in July. In August the comparative counting was done using three above described traps. As seen in the last three measurements, the new trap performed much better than any other previously known trap. Comparing to the large Pherocon IIB trap, the current trap captured almost twice as many insects as the IIB trap and at least one-third more that the medium Pherocon IIB trap.

The current trap is thus more efficacious then other previously available traps.

Figure 9:
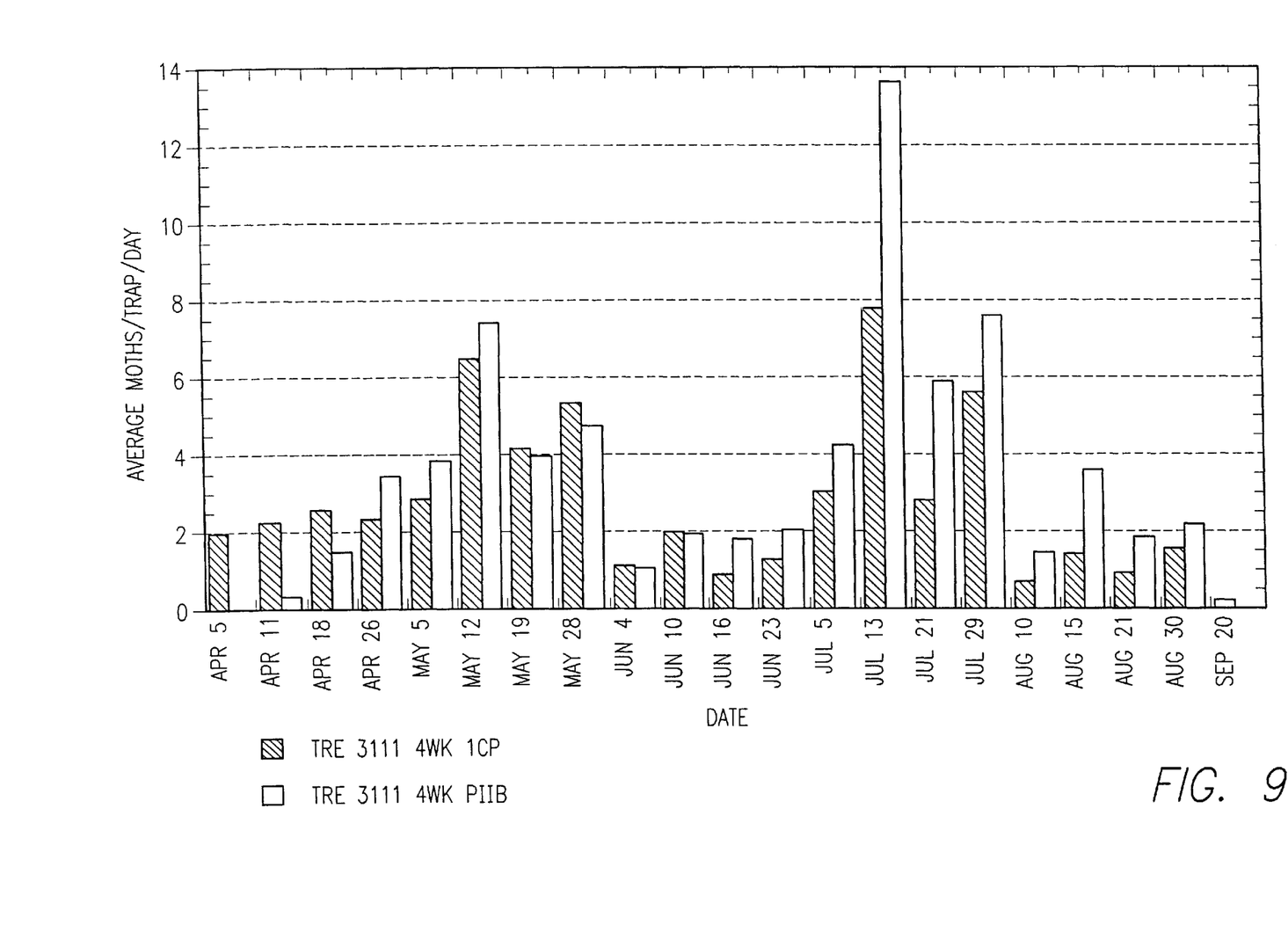
FIG. 9 is a graph illustrating trap captures of codling moth (CD) using the improved trap of the invention.

FIG. 9 is a graph illustrating trap catches of codling moth using the improved trap of the invention. The FIG. 9 illustrates a field trial using the trap of the invention to capture codling moth compared to standard Pherocon 1CP and Pherocon IIB traps. Lure for the current trap was the one used in Pherocon Standard 4 weeks trap. Lure was changed in 4 week intervals. Liner was changed in 4 weeks intervals or when soiled. The traps were placed at a density of one trap per 1.5 acres at height of six to eight feet. Traps were placed in the walnut crop field.

Results are expressed as average moths count per trap per day. As seen in FIG. 9, there were seasonal changes in counts, with maximum measured counts in August where the counts obtained with the current trap using the 4 weeks 1CP lure were double of those of the other traps. The comparative counting was done throughout the whole period of the trial using the above described traps and lures.

The current trap was found more efficacious then any other previously available traps.

Figure 10:
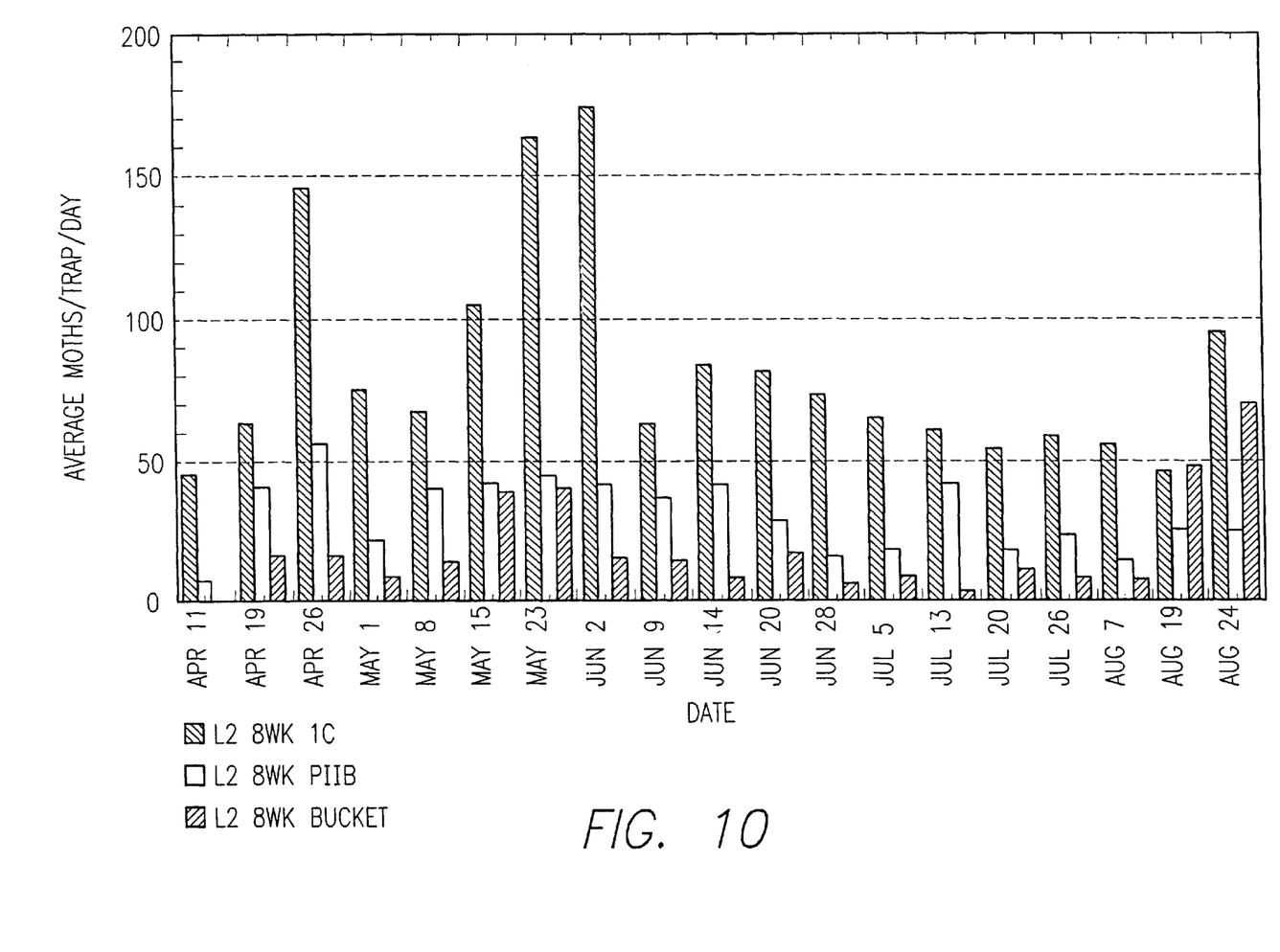
FIG. 10 is a graph illustrating trap captures of peach twig borer (PTB) using the improved trap of the invention.

FIG. 10 is a graph illustrating trap catches of peach tree borer using the improved trap of the invention. The FIG. 8 illustrates a field trial using the trap of the invention to capture peach tree borer and compared to standard Pherocon 1C, Pherocon IIB traps and Pherocon bucket trap. Lure for the current trap was the one used in Pherocon L2 trap. Lure was changed in 8 week intervals. Liner was changed in 4 weeks intervals or when soiled. The traps were placed at a density of one trap per 0.75 acres at height of six feet. Traps were placed in the almond crop field.

Results are expressed as average moths count per trap per day. As seen in FIG. 10, the most effective trap was the L2 trap 1C.1

What is claimed:

1. A collapsible insect trap comprising:

(a) a one piece configuration consisting, before assembly into the insect trap, of three panels separated by fold lines. into a middle panel and two side panels;

wherein said middle panel, positioned between said two side panels, represents a bottom part of the assembled trap;

wherein said two side panels represent a front panel and a back panel of an upper part of the assembled trap;

(b) end closures comprising a pair of protective flaps, a pair of end closure tabs, a pair of female slots and a seam; and (c) a locking clasp for a top closure of the assembled insect trap, said clasp to be opened for inspection and closed for continued use; and (d) additionally comprising an attachment means for attaching the trap to a structure where the trap is to be placed, wherein said clasp comprises a top closure strip consisting of a middle portion and two locking tabs extending therefrom, said locking tabs insertable into two openings positioned on the back panel of the assembled trap;

wherein the middle panel further comprises said protective flaps each delineating an entry opening into said insect trap, said entry openings formed by the pair of end closure tabs, the seam, and by insertion of the end closure tabs into the female slots; and wherein the internal side of the middle panel of the one piece configuration is coated with an adhesive or an insect attractant or mixture thereof and further contains a grid for captured insect calculation.

2. The trap of claim 1 wherein the adhesive is glue and the attractant is pheromone or kairomone.

3. The trap claim 2 wherein said assembled trap has a delta or diamond shape.

4. The trap of claim 3 wherein the internal side of the assembled trap is coated with a glue.

5. A method for assembling a one piece insect trap suitable for capturing an insect and for monitoring a number of captured insects, said method comprising the steps of:

a) bending two side panels along fold lines of a one-piece flat unassembled trap consisting of three panels separated by fold lines into a middle panel and two side panels, wherein the middle panel positioned between said two side panels represents a lower part of the assembled trap and wherein the middle panel further comprises a protective flap delineating an entry opening into said insect trap, said entry opening formed by an end closure tab insertion into a female slot;

wherein the two side panels represent a front panel and a back panel of an upper part of the assembled trap;

wherein the front panel comprises a clasp component for a top closure of the assembled insect trap, said clasp component comprising a top closure wire partly incorporated into the front panel, said top closure wire forming a locking device consisting of a middle portion of the wire incorporated horizontally into the front panel and of two locking tabs extending therefrom for insertion into two openings positioned in the back panel; and wherein, upon assembling, an assembled trap has an outer side and an inner side;

b) closing the top closure wire of the clasp component by inserting the locking tabs through the two openings positioned in the back panel and bending the tabs horizontally outward from the middle portion of the wire of the locking device thereby locking the trap into an assembled shape; and c) inserting the end closure tab into a female slot positioned in the middle panel of the one-piece trap thereby forming the entry opening for an insect.

6. The method of claim 5 comprising an additional step of extending from the trap, a wire hanger incorporated vertically into the front panel, said wire hanger projecting through the front panel to the outside of the trap and functions as an attachment and deployment means for the trap.

7. The method of claim 6 comprising an additional step of coating the inner side of the assembled insect trap with glue for capturing the insects or for monitoring the number of captured insects.

8. The method of claim 7 comprising the an additional step of unlocking the locking device and counting the number of insects captured on the inner glue coated side.

9. The method of claim 5 wherein the assembled trap is made of a glue coated cardboard and wherein the assembled shape is a delta or diamond shape.

* * * * *